A. L. CULBERTSON
May 17, 1932. HEATING FURNACE Re. 18,471
Original Filed Jan. 8, 1929
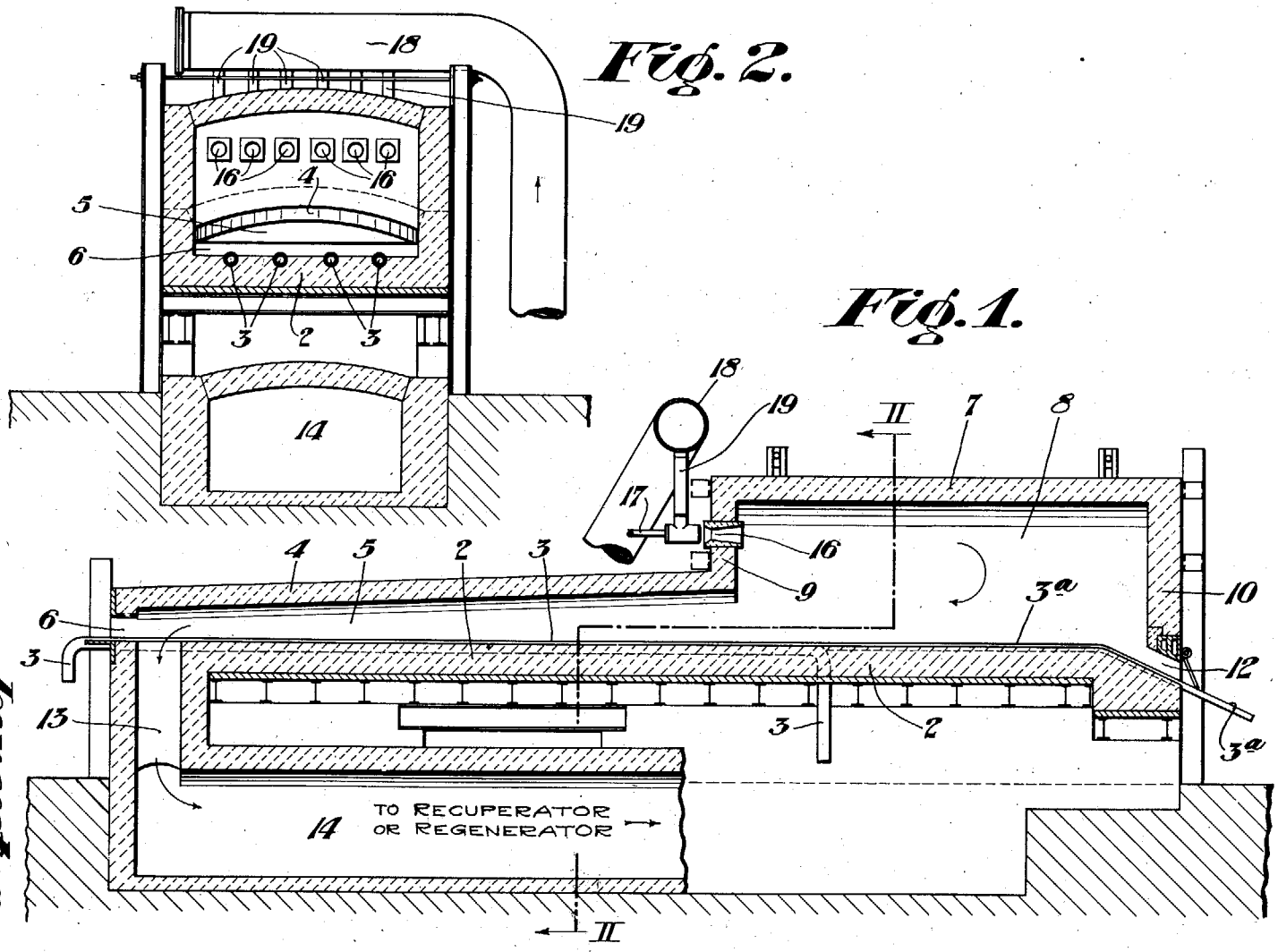
Inventor:
ALBERT L. CULBERTSON,
by: D. Anthony Usma
his Attorney.

Reissued May 17, 1932 Re. 18,471

UNITED STATES PATENT OFFICE

ALBERT L. CULBERTSON, OF MOUNT LEBANON, PENNSYLVANIA; LAVERNA M. CULBERTSON AND THE UNION TRUST COMPANY OF PITTSBURGH EXECUTORS OF SAID ALBERT L. CULBERTSON, DECEASED

HEATING FURNACE

Original No. 1,789,966, dated January 27, 1931, Serial No. 331,015, filed January 8, 1929. Application for reissue filed March 30, 1931. Serial No. 526,507.

This invention relates to heating furnaces and method of firing said furnaces and, while not limited thereto, relates more particularly to heating furnaces particularly adapted for heating billets, sheet bars and the like, and to a novel method of firing said furnaces whereby the material being heated may be heated by both radiation and contact with the flame.

One object of the invention is to provide a furnace of this class in which a vertically disposed horse-shoe shaped body of flame is formed above the material being heated at the exit or discharge end of the furnace, and whereby the flame is hottest at the back or entering end of the combustion chamber where the material is coolest so that the material may be subjected to a soaking action as it passes through the combustion chamber and the material and gases will, therefore, have substantially a uniform temperature at the exit or forward end of the combustion chamber.

Another object is to provide a furnace of this class in which the maintenance cost will be materially reduced since the flame is directed against the forward wall of the combustion chamber which is open and free to complete circulation of air.

A further object is to provide a furnace having materially increased efficiency over furnaces of the prior art wherein the flame travel is in a single direction over the material being heated.

In the drawings—

Figure 1 is a longitudinal sectional view through a furnace constructed in accordance with this invention and adapted to carry out this novel method.

Figure 2 is a transverse sectional elevation taken on the line II—II of Figure 1.

Referring more particularly to the drawings, the numeral 2 designates the furnace hearth which is of the usual horizontal construction and is provided with skid members 3 and $3^a$. The skid members 3 are water cooled while the skid members $3^a$ are solid uncooled members.

A low enclosing structure 4 is provided over the hearth 2 from the rear or entering end forwardly for a material distance and forms a low channel portion or heating chamber 5. The rear end of the enclosing structure 4 is provided with an opening 6 through which the material to be heated is charged into the furnace.

Forward of the enclosing portion 4 an enclosing portion 7 is provided which is built up a material distance above the portion 4 and extends forwardly to the forward or discharge end of the furnace and forms a combustion chamber 8. The ends of the chamber 8 are closed by rear and forward end walls 9 and 10, respectively. The forward end wall 10 is provided with an opening 12 through which the heated material is discharged.

A vertical flue 13 is provided at the rear end of the chamber 5 and extends downwardly and connects with a horizontal flue 14 which extends forwardly under the furnace and delivers the products of combustion and heated gases to any suitable recuperator or regenerator (not shown) which is adapted to supply preheated air to the burners of the furnace.

The rear wall 9 of the combustion chamber 8 is provided with a plurality of gaseous or liquid fuel burners 16 at a point adjacent the top of the wall 9 and chamber 8. The burners 16 are adapted to receive fuel through the pipe 17 and to have preheated air delivered thereto from a main conduit 18 and branch conduits 19.

It will be understood that this invention is not limited to the use of gaseous or liquid fuel burners in the chamber 8, since any fuel burners capable of delivering the flame volume may be used, also any number of burners may be used.

It will be understood that I do not wish to be limited to the use of one vertical combustion chamber 8 since more than one may be provided, if desired, and also, if desired, means may, in addition, be provided for underfiring in the ordinary manner so as to impinge a flame against the underside of the material being heated.

The operation of the above described furnace when carrying out the method of this invention is as follows:

Assuming that the furnace is charged and in operation, the flame from the burners 16 will be forced forwardly in a substantially horizontal plane through the upper portion of the combustion chamber 8 until it strikes the forward wall 10 of the chamber, which wall will force the flame-body to turn downwardly toward the furnace hearth 2 and the flame will then be compelled to flow rearwardly in seeking an escape in a direction oppositely to that of the movement of the material being heated. This rearward flow or travel of the flame will be aided materially by the draft from the flues 13 and 14 and the flame will thus be drawn the entire length of the furnace hearth. By causing a reverse flow of the flame-body so that the upper and lower portions thereof are flowing in opposite directions, a vertical horse-shoe shaped traveling flow-body of flame is provided in the combustion chamber 8 above the material being heated. The upper or forwardly traveling portion of the flow body of flame is the hottest and the lower or rearwardly traveling portion is the coolest. Therefore the coolest flame is in contact with the metal being heated while the hottest flame is separated by the cooler flame from the metal and heats the metal by radiation only.

By providing this novel flow of the flame, the length of flow for a given length of combustion chamber is increased, the hottest flame is prevented from impinging directly on the metal, a more uniform temperature throughout the combustion chamber is had, and a soaking condition is provided since the hottest flame temperature is over the cool metal as it enters the combustion chamber, and both the gases and steel are substantially at a uniform temperature at the forward or discharge end of the furnace.

Another feature resulting from the novel method of firing of this invention is that the wall 10 against which the flame impinges is free to have a complete circulation of air over its outer surface. Therefore said wall will have a materially increased life and maintenance cost will be materially reduced over that resulting when the flame is directed against the rear wall, as is ordinarily the practice.

A still further advantage resulting from the novel method of firing of this application is that the infiltration of cold air through the discharge port or opening 12 is substantially prevented due to the force of the flame at this point.

Many other advantages result from my novel method and will be apparent to those skilled in the art.

While I have shown and described one specific embodiment of my invention it will be understood that I do not wish to be limited thereto, since various modifications may be made without departing from the scope of my invention as defined in the appended claims.

I claim:

1. A continuous heating furnace for heating billets, sheet bars and the like comprising top, bottom, side and end walls, said top wall being stepped upwardly from a point intermediate the ends of said furnace to one end wall to form a high combustion chamber of more than one-third the total length of the furnace, the end wall farthest from said high combustion chamber being provided with an inlet port through which the material to be heated enters said furnace, and the other end wall closing the forward end of said high combustion chamber being provided with an outlet port opening to the atmosphere through which the heated material is discharged, at least one fuel burner mounted in the back wall of said high combustion chamber adjacent the top thereof and directing a flame against the forward end wall of said furnace, and a flue connection adjacent the rear or entering end of said furnace, said flue communicating with the interior of said furnace through the bottom wall thereof below the material being heated, said burner and said flue being arranged to cause the flame after being projected toward the forward end wall of said furnace to reverse and flow back along said furnace under the flame body issuing from said burner and then continue rearwardly in contact with the material to be heated throughout the length of said furnace.

2. A continuous heating furnace for heating billets, sheet bars and the like comprising top, bottom, side and end walls, said top wall being stepped upwardly from a point intermediate the ends of said furnace to one end wall to form a high combustion chamber of more than one-third the total length of the furnace, the end wall farthest from said high combustion chamber being provided with an inlet port through which the material to be heated enters said furnace, and the other end wall closing the forward end of said high combustion chamber being provided with an outlet port opening to the atmosphere through which the heated material is discharged, at least one fuel burner mounted in the back wall of said high combustion chamber adjacent the top thereof and adapted to direct a flame toward the forward end wall of said furnace, and a flue connection adjacent the rear or entering end of said furnace, said burner and said flue being arranged to cause the flame after being projected toward the forward end wall of said furnace to reverse and flow back along said furnace under the flame body issuing from said burner and then continue rearwardly in contact with the material to be heated throughout the length of said furnace.

3. A continuous heating furnace for heating billets, sheet bars and the like comprising top, bottom, side and end walls, said top wall being stepped upwardly from a point intermediate the ends of said furnace to one end wall to form a high combustion chamber of more than one-third the total length of the furnace, said furnace being provided at the end farthest from the high combustion chamber with an inlet port through which the material to be heated enters said furnace, and a discharge opening adjacent the other end of said furnace through which the heated material is discharged, at least one fuel burner mounted in the back wall of said high combustion chamber adjacent the top thereof and adapted to direct a flame toward the forward end wall of said furnace, and a flue connection adjacent the rear or entering end of said furnace, said flue communicating with the interior of said furnace, said burner and said flue being arranged to cause the flame after being projected toward the forward end wall of said furnace to reverse and flow back along said furnace under the flame body issuing from said body and then continue rearwardly in contact with the material to be heated through substantially the length of the furnace.

In testimony whereof, I have hereunto set my hand this 23rd day of March, 1931.

ALBERT L. CULBERTSON.